United States Patent [19]
Yu

[11] Patent Number: 6,007,148
[45] Date of Patent: *Dec. 28, 1999

[54] BICYCLE SADDLE

[75] Inventor: Tsai-Yun Yu, Taichung Hsien, Taiwan

[73] Assignee: Selle Tech Industrial Co., Ltd., Taichung Hsien, Taiwan

[*] Notice: This patent is subject to a terminal disclaimer.

[21] Appl. No.: 09/056,851

[22] Filed: Apr. 8, 1998

[51] Int. Cl.[6] ........................................................ B62J 1/02
[52] U.S. Cl. ........................ 297/195.1; 297/208; 297/209; 297/211
[58] Field of Search ................................ 297/195.1, 208, 297/209, 211

[56] References Cited

U.S. PATENT DOCUMENTS

| 5,294,174 | 3/1994 | Bigelin | 297/209 X |
| 5,443,301 | 8/1995 | Lai | 297/195.1 |
| 5,507,476 | 4/1996 | Lin | 297/209 X |

Primary Examiner—Peter M. Cuomo
Assistant Examiner—Rodney B. White
Attorney, Agent, or Firm—Browdy and Neimark

[57] ABSTRACT

A bicycle saddle is composed of a main body, a support frame, two shock-absorbing devices, and a bridge. The main body has a shape narrowing toward the front end thereof and is provided in the underside of the rear end thereof with two fastening posts. The main body is mounted on the support frame which is formed of two steel bars such that the front ends of the steel bar are joined together and fastened with the front end of the main body. Two steel bars have a hooked rear end. The shock-absorbing devices are fastened with the fastening posts of the main body and the hooked rear ends of the support frame and are composed of a cap, a shock-absorbing pad, and a base. The shock-absorbing pad has one end which is retained in the cap, and another end which is provided with a recess for retaining a conical portion of the base. The hooked rear ends of the support fame are engaged with the bases of the two shock-absorbing devices. The bridge has a beam and two end portions, which are held respectively between the shock-absorbing pad and the base of the shock-absorbing devices.

16 Claims, 3 Drawing Sheets

BICYCLE SADDLE

FIELD OF THE INVENTION

The present invention relates generally to a bicycle, and more particularly to a saddle of the bicycle.

BACKGROUND OF THE INVENTION

The conventional bicycle saddle is generally composed of a support frame of a metal material, two shock-absorbing coiled springs, and a plastic seat tapering toward the front end thereof. The support frame is formed of two metal bars such that the front ends of the metal bars are joined together to support the front end of the plastic seat, and that the rear ends of the two metal bars are fastened with the bottom ends of the coiled springs. The rear end of the plastic seat is supported by the top ends of the two coiled springs. Such conventional bicycle saddle as described above is defective in design in that the coiled springs are not effective in absorbing shock, and that the overall weight of the saddle can not be meaningfully reduced.

SUMMARY OF THE INVENTION

It is therefore the primary objective of the present invention to provide a bicycle saddle with two shock-absorbing devices which can be mounted easily and securely between a seat and a support frame of the bicycle saddle.

It is another objective of the present invention to provide a bicycle saddle with two shock-absorbing devices capable of absorbing effectively and evenly the impact exerting on the bicycle.

In keeping with the principle of the present invention, the foregoing objectives of the present invention are attained by a bicycle saddle consisting of a main body, a support frame, two shock-absorbing devices, and a bridge. The main body has a shape narrowing toward the front end thereof and is provided in the underside of the rear end thereof with two fastening posts. The main body is mounted on the support frame which is formed of two steel bars such that the front ends of the steel bars are joined together. The two steel bars have a hooked free end. The shock-absorbing devices are fastened with the fastening posts of the main body such that the shock-absorbing devices are retained by the hooked free ends of the support frame. The shock-absorbing devices are composed of a cap, a shock-absorbing pad, and a base and are secured by the fastening posts of the main body, the hooked free ends of the support frame, and the bridge.

DETAILED DESCRIPTION OF THE INVENTION

Figure 1:
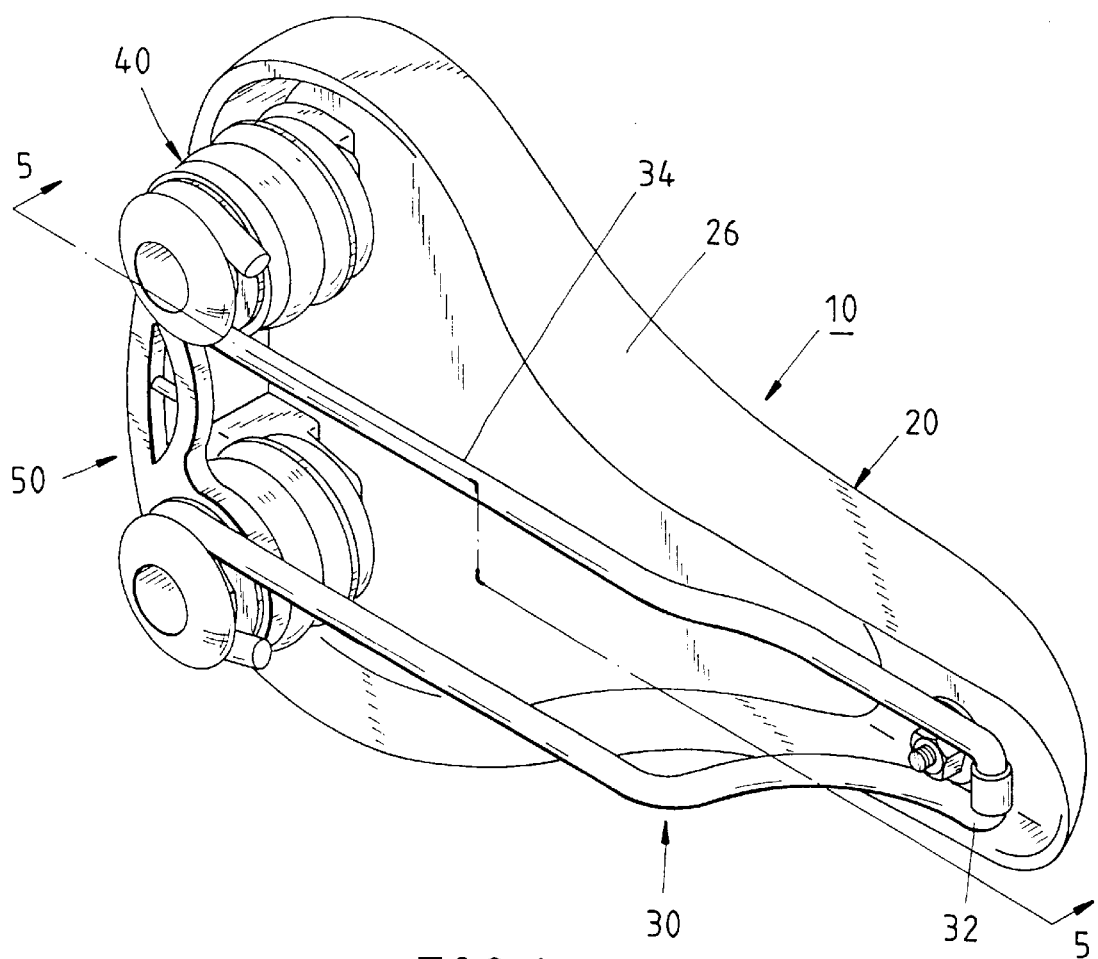
FIG. 1 shows a perspective view of a bicycle saddle embodied in the present invention.

As shown in all drawings provided herewith, a bicycle saddle 10 embodied in the present invention is composed of a main body 20, a support frame 30, two shock-absorbing devices 40, and a bridge 50.

The main body 20 is similar in shape to the conventional bicycle saddle and has a wide rear end 22, a tapered front end 24, and a slanted side 26.

The support frame 30 is formed of two steel bars 34 such that the front ends of the steel bars 34 are joined together to form a front support 32 on which the underside of the front end 24 of the main body 20 is mounted by a fastening bolt 24a, a nut 62 engaged with the bolt 24a, and a fitting ring 60 which is formed of two superimposed pieces each having a rectangular portion 60a and a circular portion 60b. The front support 32 is received in a circular space formed by the superimposed rectangular portions 60a. The fastening bolt 24a is received in a through hole 60c which is coaxially provided in the circular portions 60b.

Each of two steel bars 34 has a midsegment 34a and a hooked rear end 34b. The midsegments 34a are separated by a distance so as to facilitate the fastening of the midsegments 34a with the seat post of a bicycle frame. This is a subject matter irrelevant to the present invention. The hooked rear end 34b is intended to retain the shock-absorbing device 40.

The shock-absorbing devices 40 are made of a resilient and tough plastic material, such as a polyurethane (pu) foam material. Each of the two shock-absorbing devices 40 is made up of a shock-absorbing pad 42, a cap 44, and a base 46.

The shock-absorbing pad 42 has an upper lip 42a, which is located in a recess 44b of an apron 44a of the cap 44. The shock-absorbing pad 42 further has a lower lip 42b, which is retained in a recess 50d formed in a protruded edge 50c of a through hole 50b of a circular end 50a of the bridge 50, such that the lower lip 42b is in contact with an upper shoulder 50e of the protruded edge 50c. The shock-absorbing pad 42 is further provided with a tapered recess 42c extending from the lower lip 42b toward the pad body for locating a conical portion 46a of the base 46. The base 46 is provided with a first disk 46b contiguous to the conical portion 46a, a second disk 46c contiguous to the first disk 46b, and a columnar portion 46d located between the two disks 46b and 46c. The first disk 46b has an outer diameter greater than the hole diameter of the through hole 50b of the bridge 50 for securing the bridge 50. The columnar portion 46d is smaller in outer diameter than the disks 46b and 46c for forming a circular recessed portion 46e for engaging the hooked rear end 34b of the steel bar 34.

Figure 6:
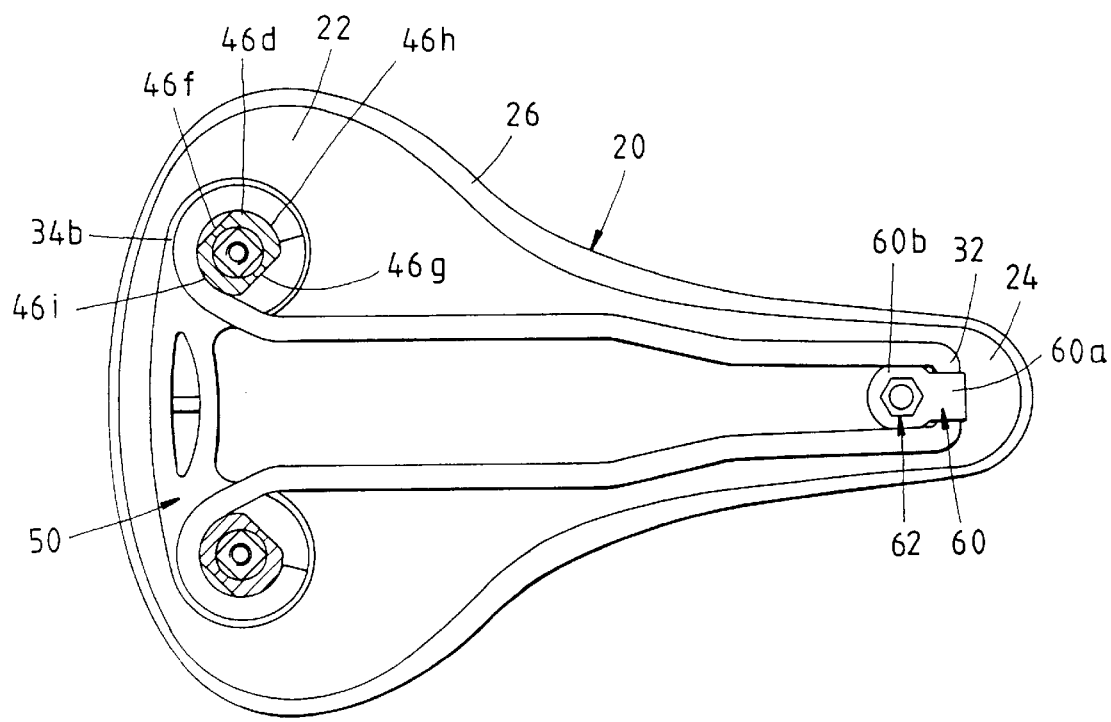
FIG. 6 shows a bottom view and certain sectional views of the bicycle saddle of the present invention.

As shown in FIG. 6, columnar portion 46a has two flat straight surfaces 46f and 46g, and two arcuate surfaces 46h and 46i which are located between the flat straight surfaces 46f and 46g. The hooked rear end 34b is formed of two arms which are separated by a distance slightly smaller than the distance between the two arcuate surfaces 46h and 46i but greater than the distance between the two flat straight surfaces 46f and 46g. In combination, the two arms of the hooked rear end 34b are inserted into the circular recessed portion 46e in such a manner that the two arms of the hooked rear end 34b are parallel to the two flat straight surfaces 46f and 46g, and that the two arms are turned an angle so as to cause the two arms to make contact with the two arcuate surfaces 46h and 46i. As a result, the steel bar 34 is secured with the base 46 of the shock-absorbing device 40.

The bridge 50 is made of a resilient plastic material by injection molding and is composed of two circular end portions 50a of a hollow construction, and a beam 50f located between the two circular end portions 50a. The beam 50f is provided at the center thereof with an elongated hole 50g and a partition 50h for making the beam 50f pliable. In light of the circular end portion 50a being held between the shock-absorbing pad 42 and the base 46, the impact force exerting on the shock-absorbing device 40 can be imparted by the beam 50f.

Figure 4:
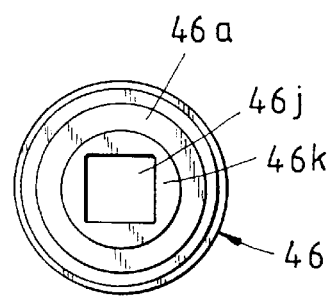
FIG. 4 shows a top plan view of a base of the shock-absorbing device of the present invention.
Figure 2:
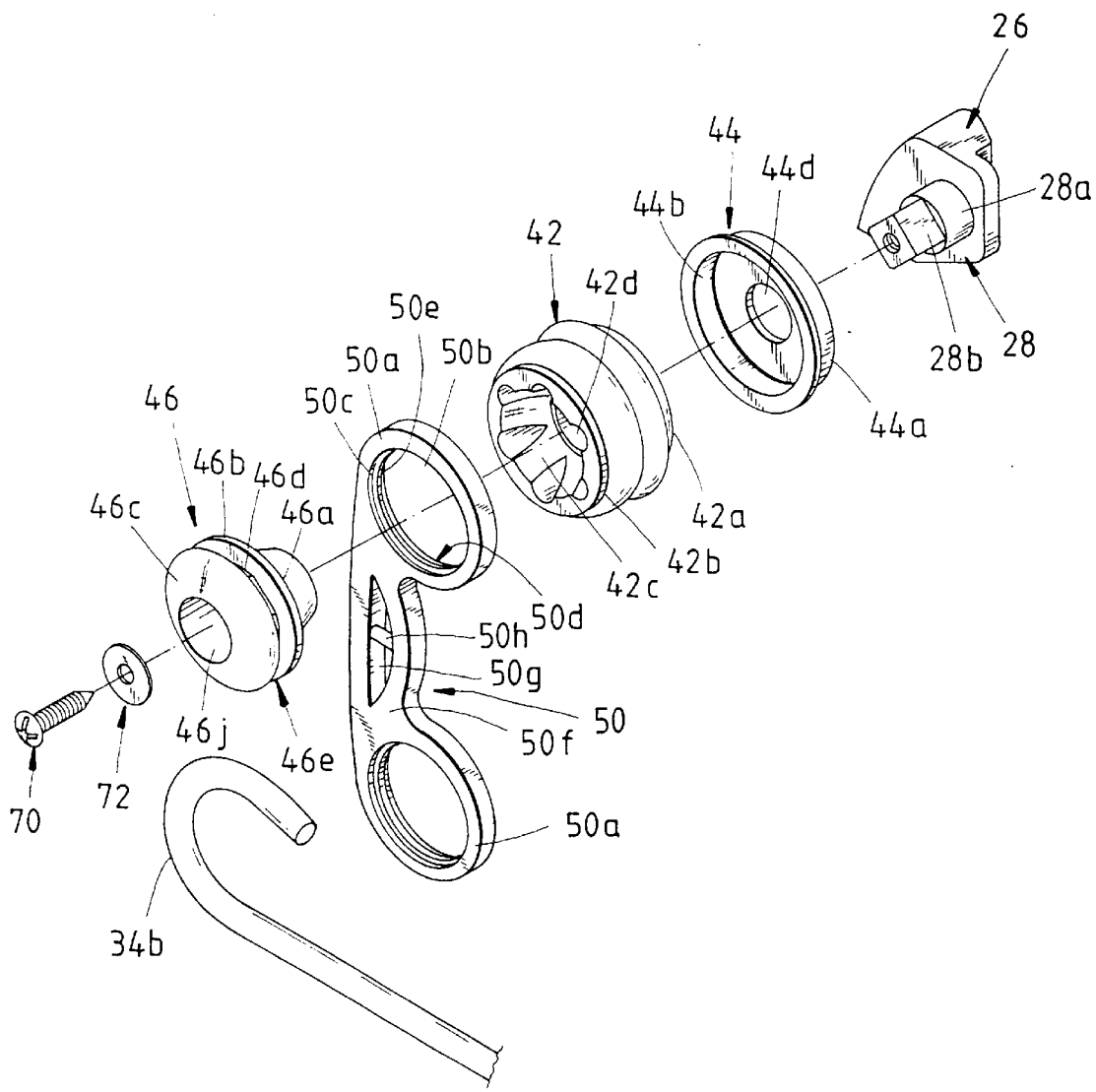
FIG. 2 shows a partial exploded view of the bicycle saddle of the present invention.
Figure 5:
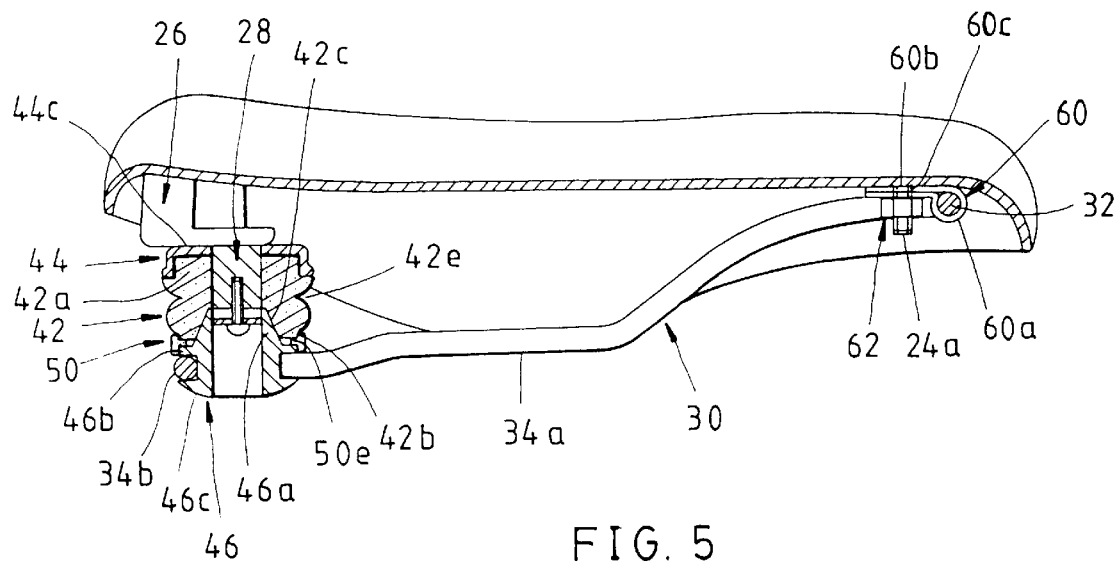
FIG. 5 shows a sectional view of a portion taken along the direction indicated by a line 5—5 as shown in FIG. 1.

The wide rear end 22 of the main body 20 is provided in the underside thereof with two suspended platforms 26 which are in turn provided respectively with a fastening post 28 extending therefrom and having a round columnar portion 28a and a square columnar portion 28b. The cap 44 has a cover surface 44c, which is provided at the center thereof with a through hole 44d. The shock-absorbing pad 42 is provided with a round axial hole 42d for fitting sequentially over the round columnar portions 28a. The base 46 has an axial hole 46j with a square outlet 46k located at the top end of the conical portion 46a, as shown in FIG. 4, to receive the square columnar portion 28b so as to locate the base 46. The cap 44, the shock-absorbing pad 42, the base 46, and the bridge 50 are fastened with the fastening post 28 by a bolt 70 and a washer 72.

Figure 3:
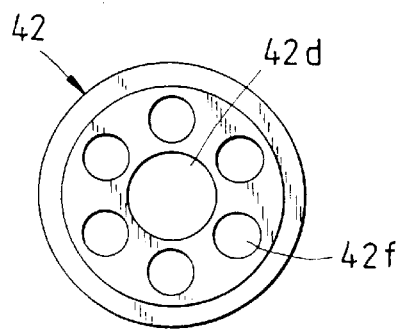
FIG. 3 shows a top plan view of a shock-absorbing pad of the present invention.

The shock-absorbing devices 40 are securely located under the rear end 22 of the main body 20 such that the shock-absorbing pad 42 is held securely by the cap 44 and the conical portion 46a of the base 46, and that the shock-absorbing pad 42 and the base 46 are further secured by the bridge 50. As a result, the bicycle saddle 10 of the present invention is capable of absorbing shock evenly and effectively. In order to enhance the shock-absorbing effect of the shock-absorbing pad 42, the shock-absorbing pad 42 is provided in the surface thereof with a recessed waist portion 42e and a plurality of through holes 42f having a center line parallel to the center line of an axial hole 42d of the shock-absorbing pad 42, as shown in FIG. 3. If necessary , the recessed waist portion 42e may be increased in number. It must be noted here that the through holes 42f extend throughout the body of the shock-absorbing pad 42.

What is claimed is:

1. A bicycle saddle comprising:

a main body having a front end and a rear end provided in an underside thereof with two fastening posts separated at an interval, said front end being smaller in width than said rear end;

a support frame located under said main body and formed of two bars such that two front ends of said two bars are joined together under said front end of said main body, and that two rear ends of said two bars have a hooked rear end;

two shock-absorbing devices fastened over said fastening posts of said main body and engaged to said hooked rear ends of said support frame, said shock-absorbing devices having a cap, a shock-absorbing pad of a plastic material, and a base, said cap having a cover surface provided in a center thereof with a through hole fitted over said fastening post, said shock-absorbing pad having an axial hole fitted over said fastening post such that a first end of said shock-absorbing pad engages said cap, said base engages a second end of said shock-absorbing pad when said base is fastend with said fastening post , and that said base is fixed to said hooked rear end of said bars; and a bridge having two end portions and a beam located between said two end portions, said two end portions being engaged with said two shock-absorbing devices.

2. The bicycle saddle as defined in claim 1, wherein said rear end of said main body is provided in said underside thereof with two suspended platforms separated at an interval; and wherein said two fastening posts are extended from said two suspended platforms.

3. The bicycle saddle as defined in claim 1, wherein said cap has an apron extending from a periphery thereof, and a recess formed by said apron.

4. The bicycle saddle as defined in claim 3, wherein said shock-absorbing pad has a body and an upper lip smaller in outer diameter than said body, said upper lip being retained in said recess of said cap.

5. The bicycle saddle as defined in claim 1, wherein said shock-absorbing pad has a body and a lower lip smaller in outer diameter than said body.

6. The bicycle saddle as defined in claim 5, wherein said two end portions of said bridge are provided with a through hole having in an inner wall thereof a protruded edge forming an upper circular recess and a lower circular recess; and wherein said lower lip is retained in said upper circular recess.

7. A bicycle saddle comprising:

a main body having a front end and a rear end provided in an underside thereof with two fastening posts separated at an interval, said front end being smaller in width than said rear end;

a support frame located under said main body and formed of two bars such that two front ends of said two bars are joined together under said front end of said main body, and that two rear ends of said two bars have a hooked rear end;

two shock-absorbing devices fastened over said fastening posts of said main body and engaged to said hooked rear ends of said support frame, said shock-absorbing devices having a cap, a shock-absorbing pad of a plastic material, and a base, said cap having a cover surface provided in a center thereof with a through hole fitted over said fastening post, said shock-absorbing pad having an axial hole fitted over said fastening post such that a first end of said shock-absorbing pad engages said cap, said base engages a second end of said shock-absorbing pad when said base is fastened with said fastening post, and that said base is fixed to said hooked rear end of said bars;

a bridge having two end portions and a beam located between said two end portions, said two end portions being engaged with said two shock-absorbing devices; and wherein said shock-absorbing pad has a body and a tapered recess of a depth and extending into said body of said shock absorbing.

8. The bicycle saddle as defined in claim 7, wherein said base has a conical portion extending through said through hole of said end portions of said bridge such that said conical portion is received in said tapered recess of said shock-absorbing pad.

9. The bicycle saddle as defined in claim 8, wherein said base has two disks located under said conical portion, and a columnar portion connecting said two disks, said two disks having an outer diameter greater than a diameter of a through hole of said end portions of said bridge so as to enable said disks to be in contact with wall of said through hole, said columnar portion being smaller in outer diameter than said disks for forming a circular recessed portion which is engaged with said hooked rear end of said bars of said support frame.

10. The bicycle saddle as defined in claim 9, wherein said columnar portion has two flat straight surfaces and two arcuate surfaces located between said two flat straight surfaces; and wherein said two hooked rear ends of said support frame are separated by a distance smaller than a distance between said two arcuate surfaces but greater than a distance between said two flat straight surfaces.

11. The bicycle saddle as defined in claim 8, wherein said fastening post has a round base and a square columnar portion.

12. The bicycle saddle as defined in claim 7, wherein said base has an axial hole provided with a square outlet located at a top end of said conical portion for retaining said square columnar portion of said fastening post so as to locate said base.

13. The bicycle saddle as defined in claim 7, wherein said shock-absorbing body has a body provided in a surface thereof with a plurality of recessed waist portions for increasing an elasticity of said shock-absorbing pad.

14. The bicycle saddle as defined in claim 7, wherein said shock-absorbing pad has a body provided with an axial hole and a plurality of through holes extending throughout said body such that a center line of each of said through holes is parallel to a center line of said axial hole for adjusting an elasticity of said shock-absorbing pad.

15. The bicycle saddle as defined in claim 1, wherein said front ends of said two bars of said support frame are fastened under said front end of said main body by a fastening bolt engageable with a nut in conjunction with a washer.

16. A bicycle saddle comprising:
a main body having a front end and a rear end, with said front end being smaller in width than said rear end, said rear end provided in an underside thereof with two fastening posts attached thereto such that said fastening posts are separated at an interval;
a support frame located under said main body and composed of two bars such that two front ends of said two bars are joined together and fastened under said front end of said main body, and that two rear ends of said two bars have a hooked rear end; and
two shock-absorbing devices fastened with said two fastening posts of said rear end of said main body and connected with said two bars of said support frame, said two shock-absorbing devices comprising:
a cap having a surface, an apron extending from a periphery of said surface, and a recess formed by said apron, said surface provided at a center thereof with a through hole;
a shock-absorbing pad of a plastic material and having an axial hole, an upper lip smaller in outer diameter than a body of said shock-absorbing pad, and a lower lip smaller in outer diameter than said body of said shock-absorbing pad, said lower lip provided with a tapered recess of a depth and extending toward said body, said upper lip being retained in said recess of said cap, said body of said shock-absorbing pad provided with a plurality of recessed waist portions;
a bridge having a beam and two end holes each having in an inner wall thereof a protruded edge forming two circular recesses, with one of said two circular recesses being engaged with said lower lip of said shock-absorbing pad; and
a base having a conical portion, two disks located under said conical portion, a columnar portion located between said two disks, and an axial hole extending through a body of said base, said conical portion being located in said tapered recess of said shock-absorbing pad via one of said two end holes of said bridge, said two disks having an outer diameter greater than a diameter of said end holes to enable said disks to make contact with a wall of said end holes, said columnar portion being smaller in outer diameter than said disks for forming a circular recessed portion intended to engage said hooked rear end of said two bars of said support frame;
said cap, said shock-absorbing pad, said bridge, and said base being sequentially fitted over and fastened with said fastening post of said main body by a fastening bolt put through said axial hole of said base.

* * * * *